US009801085B2

(12) United States Patent
Hévizi et al.

(10) Patent No.: US 9,801,085 B2
(45) Date of Patent: Oct. 24, 2017

(54) RADIO TRAFFIC DETECTOR, NETWORK NODE AND METHODS FOR ASSISTING HANDOVER

(71) Applicant: Telefonaktiebolaget L M Ericsson (publ), Stockholm (SE)

(72) Inventors: László Hévizi, Piliscsaba (HU); István Gódor, Budapest (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 59 days.

(21) Appl. No.: 14/889,377

(22) PCT Filed: May 7, 2013

(86) PCT No.: PCT/SE2013/050513
§ 371 (c)(1),
(2) Date: Nov. 5, 2015

(87) PCT Pub. No.: WO2014/182205
PCT Pub. Date: Nov. 13, 2014

(65) Prior Publication Data
US 2016/0095006 A1    Mar. 31, 2016

(51) Int. Cl.
*H04W 24/08* (2009.01)
*H04W 36/00* (2009.01)
*H04W 76/04* (2009.01)

(52) U.S. Cl.
CPC ....... *H04W 24/08* (2013.01); *H04W 36/0083* (2013.01); *H04W 36/0088* (2013.01); *H04W 76/046* (2013.01)

(58) Field of Classification Search
None
See application file for complete search history.

(56) References Cited

U.S. PATENT DOCUMENTS

2007/0249354 A1    10/2007    Seo et al.
2009/0129341 A1    5/2009     Balasubramanian et al.
(Continued)

FOREIGN PATENT DOCUMENTS

EP    1775984 A2    4/2007
EP    2536197 A1    12/2012
(Continued)

OTHER PUBLICATIONS

Teyeb, Oumer et al., "Wi-Fi Integration Tutorial", Ericsson Internal, 3GPP/WiFi Integration, Oct. 27, 2012, 1-30.

*Primary Examiner* — Diane Lo
(74) *Attorney, Agent, or Firm* — Murphy, Bilak & Homiller, PLLC (57) ABSTRACT

It is presented a method arranged to assist a determination of mobile devices being candidates for handover. The method is performed in a radio traffic detector and comprises: measuring a received signal strength value on a predetermined frequency band; repeating the measuring during a time period; generating a message comprising a timestamp associated with the time period, and a plurality of message elements, wherein each message element is based on a respective received signal strength value for respectively different time instances within the time period; and transmitting the message to a network node to assist the determination of mobile devices being candidates for handover. By using measured received signal strength, uplink traffic can be detected without the need to decode the signals. Corresponding radio traffic device, network node and method are also presented.

14 Claims, 7 Drawing Sheets

(56) References Cited

U.S. PATENT DOCUMENTS

| | | | |
|---|---|---|---|
| 2011/0038350 A1* | 2/2011 | Gholmieh | H04W 36/00 370/331 |
| 2012/0309431 A1* | 12/2012 | Bodog | H04W 16/18 455/456.6 |
| 2013/0210435 A1 | 8/2013 | Dimou et al. | |
| 2014/0031027 A1* | 1/2014 | Dalsgaard | H04W 36/30 455/418 |

FOREIGN PATENT DOCUMENTS

| | | |
|---|---|---|
| EP | 2608423 A2 | 6/2013 |
| GB | 2446193 A | 8/2008 |
| GB | 2493183 A | 1/2013 |
| WO | 2009108723 A2 | 9/2009 |
| WO | 2012005657 A1 | 1/2012 |

\* cited by examiner

RADIO TRAFFIC DETECTOR, NETWORK NODE AND METHODS FOR ASSISTING HANDOVER

TECHNICAL FIELD

The invention relates to assisting a determination of mobile devices being candidates for handover.

BACKGROUND

Mobile devices today often support multiple radio access technologies (RATs), such as Wi-Fi and mobile networks (such as 2G/3G/4G). Mobile devices are many times on their own in finding the network and network type that best suits the actual demand. Hence, mobile devices often have a choice of attaching to large cells of mobile networks or to small cells in hot spots. Nowadays, the large cells are usually the macro cells of mobile networks and the small cells are mostly Wi-Fi access points, but 3G/4G pico and femto cells have been also installed in growing numbers recently.

Hence, it is desired that mobile networks are made to work smoothly together with network technologies for the small cells, e.g. networks operating in non-licensed bands, such as Wi-Fi. One way to achieve such interworking is a so called Inter Radio Access Technology (IRAT) handover process. This process splits the tasks between the network and mobile devices and can reduce processor and battery limitations of mobile devices.

In order to keep requirements on mobile devices low, it is desired that the measurement and reporting duties of mobile devices are kept low. However, as new technologies and operating frequency bands are introduced, any monitoring and reporting by the mobile device is only likely to increase, which increases power usage and decreases battery life.

WO 2009/108723 presents a detecting base station which detects a wireless communication device by intercepting an uplink communication signal intended for an originating base station. In response to the detection of the wireless communication device, the detecting base station sends a message to the core network. The detecting base station includes a mobile communication device detector configured to intercept the uplink communication signal transmitted from the wireless communication device to the originating base station of a communication network. A network interface within the detecting base station is configured to send a device proximity message to the communication network where the device proximity message is based on the proximity of the wireless communication device to the detecting base station. The device proximity message may be a handoff request, distance, or other information that is derived or otherwise related to the intercepted uplink communication signal.

However, such a solution requires the detecting base station to intercept, which requires decoding of signals. Such decoding of signals is not only resource demanding but also dependent on the communication technology used.

It would be of great benefit if there was a way to detect uplink traffic for identification of the source device without the need to decode the uplink traffic signal.

SUMMARY

It is an object to simplify the detection of uplink traffic for assisting the determination of mobile devices being candidates for handover.

According to a first aspect, it is presented a method arranged to assist a determination of mobile devices being candidates for handover. The method is performed in a radio traffic detector and comprises: measuring a received signal strength value on a predetermined frequency band; repeating the measuring during a time period; generating a message comprising a timestamp associated with the time period, and a plurality of message elements, wherein each message element is based on a respective received signal strength value for respectively different time instances within the time period; and transmitting the message to a network node to assist the determination of mobile devices being candidates for handover. By using measured received signal strength, uplink traffic can be detected without the need to decode the uplink signals. This allows the radio traffic detector to be network agnostic and power efficient. Moreover, there is no need for the mobile device to perform any measurements at this stage.

In the generating a message, each message element may comprise a logical value, and the generating a message may comprise determining each logical value to be positive when an associated received signal strength value is above a threshold value, the positive value of the message element indicating a significant received signal strength. In this way, each message element does not use up much space, making the message efficiently small.

The generating a message may comprise including the respective received signal strength value in each message element. This allows the network node to flexibly analyse the received signal strength values.

The method may further comprise: entering a power saving mode; and exiting the power saving mode and returning to the measuring when a timer expires. By only measuring received signal power, the power saving mode (e.g. sleep mode, dormant mode, idle mode, etc.) can be used in between measurements, which can be a significant portion of the time.

According to a second aspect, it is presented a radio traffic detector arranged to assist a determination of mobile devices being candidates for handover. The radio traffic detector comprises: a processor; and a computer program product storing instructions that, when executed by the processor, causes the radio traffic detector to: measure a received signal strength value on a predetermined frequency band; repeat the measuring during a time period; generate a message comprising a timestamp associated with the time period, and a plurality of message elements, wherein each message element is based on a respective received signal strength value for respectively different time instances within the time period; and transmit the message to a network node to assist the determination of mobile devices being candidates for handover.

The instructions to generate a message may comprise instructions to generate each message element comprising a logical value, to determine each logical value to be positive when an associated received signal strength value is above a threshold value, the positive value of the message element indicating a significant received signal strength.

The instructions to generate a message may comprise instructions to make each message element a copy of the respectively associated received signal strength value.

The radio traffic detector may further comprise instructions to: enter a power saving mode; and exit the power saving mode and return to the measuring when a timer expires.

According to a third aspect, it is presented a radio traffic detector. The radio traffic detector comprises: means for measuring a received signal strength value on a predetermined frequency band; means for repeating the measuring during a time period; means for generating a message comprising a timestamp associated with the time period, and a plurality of message elements, wherein each message element is based on a respective received signal strength value for respectively different time instances within the time period; and means for transmitting the message to a network node to assist the determination of mobile devices being candidates for handover In the means for generating a message, each message element may comprise a logical value, and the means for generating a message may comprise means for determining each logical value to be positive when an associated received signal strength value is above a threshold value, the positive value of the message element indicating a significant received signal strength.

The means for generating a message may comprise means for including the respective received signal strength value in each message element.

The radio traffic detector may further comprise: means for entering a power saving mode; and means for exiting the power saving mode and returning to the measuring when a timer expires.

According to a fourth aspect, it is presented a method arranged to determine a mobile device being a candidate for handover. The method is performed in a network node and comprises: receiving a message from a radio traffic detector, the message comprising a timestamp associated with a time period and comprising a plurality of message elements, wherein each message element is based on a respective received signal strength value for respectively different time instances within the time period; and determining a mobile device to be a candidate for handover by comparing the message with a history of radio traffic, wherein the history of radio traffic comprises data about what mobile devices were active at what times. By comparing message elements based on the received signal strength in time with the history of radio traffic, it can be determined which mobile device was active at a time corresponding to a peak in the received signal strength. In this way, the network node can determine such mobile devices to be candidates to handover as they are active in the proximity of the radio traffic detector.

The determining may comprise determining a mobile device to be a candidate for handover when, for at least a threshold number of instances, there is an indication of activity of the mobile device in the history of radio traffic and, for a corresponding time, a message element indicating a significant received signal strength, wherein the history of radio traffic corresponds to the time period. Using the threshold, the risk is reduced to include mobile devices from elsewhere in the network, which would cause circumstantial, erroneous, matches.

In the determining a mobile device to be a candidate for handover, the threshold number of instances may be the number of message elements which have an indication of activity of the mobile device at a corresponding time in the history of radio traffic. In other words, any activity in the history of radio traffic in the time period needs to have a corresponding activity indicated in the message elements. This reduces the risk of including circumstantial matches even further.

The method may further comprise: transmitting a handover candidate message to a network manager node, the handover candidate message comprising identities of one or more mobile devices having been determined to be candidates for handover. The network manager node can then e.g. perform a more detailed handover process by involving measurements from the mobile devices.

The method may further comprise: discarding items in the history of radio traffic being older than a threshold age.

According to a fifth aspect, it is presented a network node arranged to determine a mobile device being a candidate for handover, the network node comprising: a processor; and a computer program product storing instructions that, when executed by the processor, causes the network node to: receive a message from a radio traffic detector, the message comprising a timestamp associated with a time period and comprising a plurality of message elements, wherein each message element is based on a respective received signal strength value for respectively different time instances within the time period; and determine a mobile device to be a candidate for handover by comparing the message with a history of radio traffic, wherein the history of radio traffic comprises data about what mobile devices were active at what times.

The instructions to determine may comprise instructions to determine a mobile device to be a candidate for handover when, for at least a threshold number of instances, there is an indication of activity of the mobile device in the history of radio traffic and, for a corresponding time, a message element indicating a significant received signal strength, wherein the history of radio traffic corresponds to the time period.

The instructions to determine a mobile device to be a candidate for handover, may comprise instructions for the threshold number of instances being the number of message elements which have an indication of activity of the mobile device at a corresponding time in the history of radio traffic.

The network node may further comprise instructions to: transmit a handover candidate message to a network manager node, the handover candidate message comprising identities of the mobile devices having been determined to be candidates for handover.

The network node may further comprise instructions to: discard items in the history of radio traffic being older than a threshold age.

According to a sixth aspect, it is presented a network node. The network node comprises: means for receiving a message from a radio traffic detector, the message comprising a timestamp associated with a time period and comprising a plurality of message elements, wherein each message element is based on a respective received signal strength value for respectively different time instances within the time period; and means for determining a mobile device to be a candidate for handover by comparing the message with a history of radio traffic, wherein the history of radio traffic comprises data about what mobile devices were active at what times.

The means for determining may comprise means for determining a mobile device to be a candidate for handover when, for at least a threshold number of instances, there is an indication of activity of the mobile device in the history of radio traffic and, for a corresponding time, a message element indicating a significant received signal strength, wherein the history of radio traffic corresponds to the time period.

In the means for determining a mobile device to be a candidate for handover, the threshold number of instances is the number of message elements which have an indication of activity of the mobile device at a corresponding time in the history of radio traffic.

The network node may further comprise means for transmitting a handover candidate message to a network manager node, the handover candidate message comprising identities of one or more mobile devices having been determined to be candidates for handover.

The network node may further comprise means for discarding items in the history of radio traffic being older than a threshold age.

It is to be noted that whenever the term positive value is used in the description and claims, it should be interpreted as an affirmative value, e.g. a single bit being one or a Boolean parameter being true. Accordingly, whenever the term negative value is used in the description and claims, it should be interpreted as the opposite of an affirmative value, e.g. a single bit being zero or a Boolean parameter being false.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
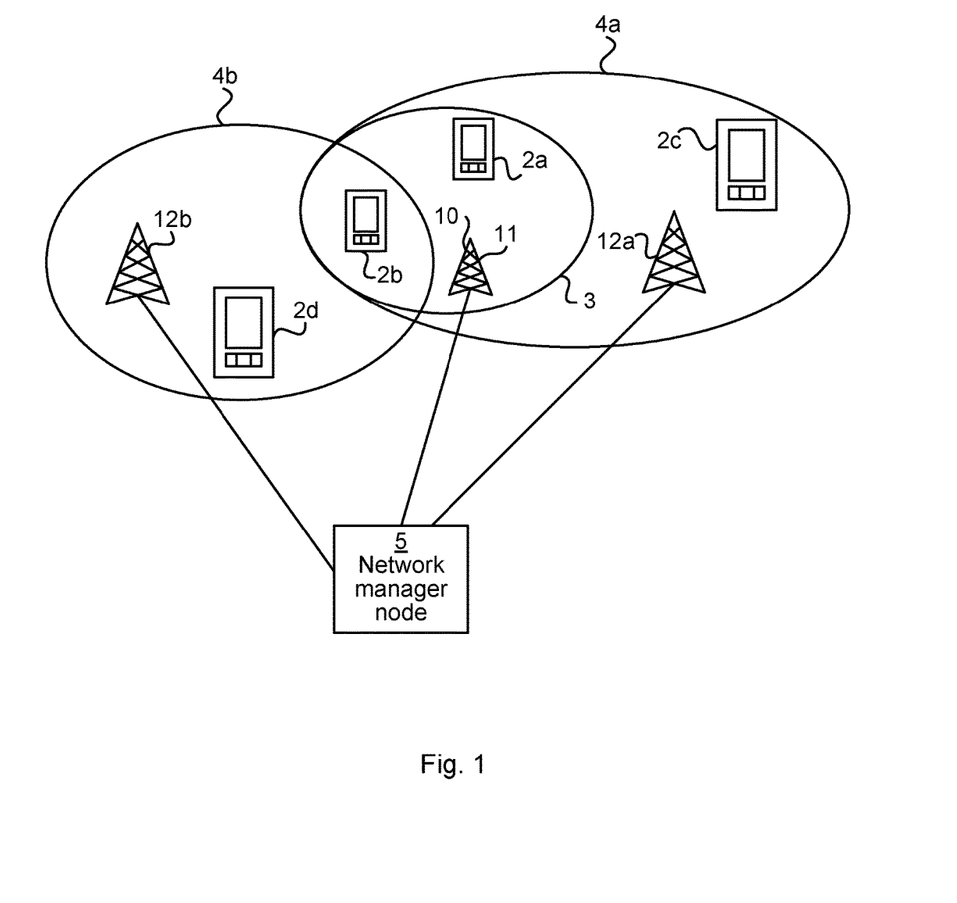
FIG. 1 is a schematic diagram illustrating a heterogeneous network where embodiments presented herein may be applied.

FIG. 1 is a schematic diagram illustrating a heterogeneous network where embodiments presented herein may be applied. There are here two radio base stations 12a-b which are part of a mobile network. The mobile network may e.g. comply with any one or a combination of LTE (Long Term Evolution), W-CDMA (Wideband Code Division Multiplex), EDGE (Enhanced Data Rates for GSM (Global System for Mobile communication) Evolution), GPRS (General Packet Radio Service), CDMA2000 (Code Division Multiple Access 2000), and WiMAX (Worldwide Interoperability for Microwave Access) or any other current or future mobile network, as long as the principles described hereinafter are applicable.

There is also an access point 11 for another network that may or may not share the radio access technology (RAT) of the mobile network comprising the two radio base stations 12a-b. The access point 11 is here described as being a Wi-Fi hotspot, but the access point could equally well form part of any network. For example, the access point 11 could implement a picocell or femtocell of the same or other mobile network type compared to the mobile network of the two radio base stations 12a-b. In other words, the access point 11 can provide access to a network complying with any one or a combination of any IEEE 802.11x standard, any other wireless local area network (WLAN) standard, LTE, W-CDMA, EDGE, GPRS, CDMA2000, or any other current or future mobile network, as long as the principles described hereinafter are applicable. While FIG. 1 only shows one access point 11, the network can comprise any suitable number of access points. There is a radio traffic detector 10 associated with the access point 11. The radio traffic detector 10 can be provided as a separate device, separate from the access point 11. Alternatively, the radio traffic detector 10 is integrated with the access point 11. The radio traffic detector 10 is arranged to detect uplink signals from mobile devices as is described in more detail below.

The network also comprises a core network, of which a network manager node 5 can be part. Alternatively, the network manager node 5 is provided in parallel to any core network. One function of the network manager node is to manage handovers between networks of different RATs.

The radio base stations 12a-b and the access point 11 provide radio connectivity to a plurality of mobile devices 2a-d. The term mobile device is also known as user equipment, wireless device, mobile communication terminal, mobile terminal, user terminal, user agent, etc. Some (at least one) of the mobile devices 2a-d are multi-RAT capable, and are thus capable of connecting with both the radio base stations 12a-b and the access point 11, radio signal strength permitting.

Uplink and downlink communication between each mobile device 2a-d and the radio base stations 12a-b and the access point 11 occurs over a wireless radio interface. The radio base stations 12a-b provide access in respective mobile network cells 4a-b and the access point 11 provides coverage in a smaller cell 3. The quality of the wireless radio interface to each mobile device 2a-d varies over time and also depends on the position of the mobile devices 2a-d, due to effects such as fading, multipath propagation, interference, etc.

When the network is multi-RAT capable, the network manager node 5 operates to integrated network management between the RATs. It is then desired that the network manager node 5 directs mobile devices to radio base stations 12a-b or access points ii, which are beneficial from a certain aspect, but the trade-offs should not compromise experienced performance by the users.

One process that can be used in multi-RAT networks is that the mobile devices 2a-d periodically, and in parallel, detect and monitor several RATs. The mobile devices can e.g. measure the beacons of various RATs either on a request from the network side or based on some periodic schedule on the mobile device side. The mobile devices 2a-d report the measured field strength to their serving cell node (i.e. the radio base station or access point, to which the mobile device 2a-d in question is currently connected). The field strength is then forwarded to the network manager node 5 and the network manager node 5 can then decide whether it is worth to start a handover to a an access point or not, similarly to the case of normal intra-RAT handover procedure.

Figure 2:
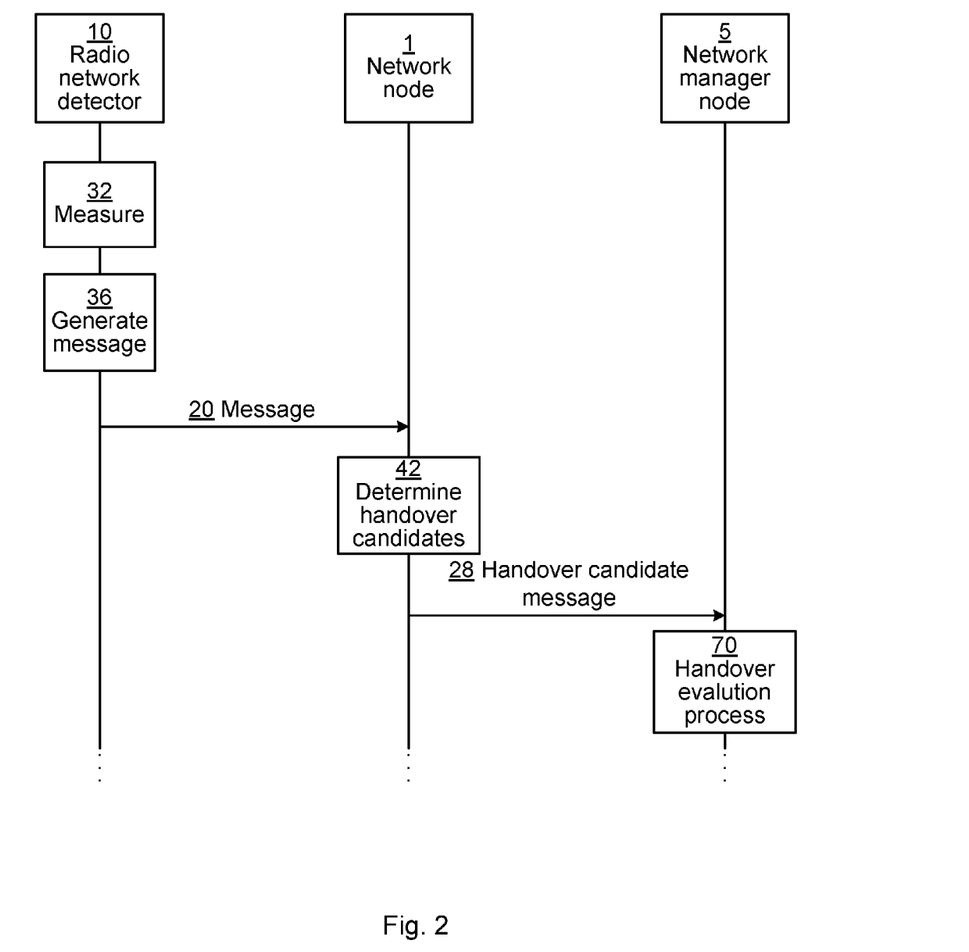
FIG. 2 is a sequence diagram illustrating an example of signalling for assisting handover in the network of FIG. 1.

FIG. 2 is a sequence diagram illustrating an example of signalling for assisting handover in the network of FIG. 1. The nodes involved in this sequence are the radio traffic detector 10, a network node 1 and a network manager node 5. As is explained in more detail below, the network node can e.g. be comprised in or connected to one of the radio base stations 12a-b of FIG. 1.

The radio traffic detector 10 initially measures 32 received signal strength, as is described in more detail below with reference to FIGS. 4A-B. The purpose of the measuring is to detect mainly uplink transmissions from mobile devices within detecting range of the radio traffic detector 10. It is to be noted that the network detector 10 does not need to decode the signals from the mobile devices as other mechanisms are used to identify the active mobile devices as is explained in more detail below. In this way, by only measuring received signal strength, the radio traffic detector is network type agnostic. Furthermore, since no decoding of radio signals is required, the radio traffic detector can be a relatively simple and energy efficient device.

Based on the measurements, the radio traffic detector generates 36 a message and sends the message 20 to the network node 1. The message comprises a number of message elements which are based on the measurements.

The network node 1 uses the message elements of the message, which is based on the received signal strength, along with a history of radio traffic, in a matching process to identify what mobile devices were likely to be active within detecting range of the radio traffic detector 10. This matching is explained in more detail below. This results in a set of zero or more mobile devices being candidates for handover.

The network node 1 then sends a handover candidate message 28 comprising the set of mobile devices which are candidates for handover to the network manager node 5. The handover candidate message is optionally omitted when no mobile devices being candidates for handover are found. The handover candidate message 28 can be a single message comprising all mobile devices being candidates for handover during a certain time period. Alternatively, one handover candidate message 28 is transmitted for each mobile device being a candidate for handover.

Once the network manager node 5 has received identities of the one or more mobile devices being candidates for handover, the network node manager 5 performs a handover evaluation process 70 for each mobile device being a candidate for handover. The handover evaluation process 70 can for example include requesting the mobile device in question to perform measurements to evaluate whether a handover to the access point being associated with the radio traffic detector 10 would be beneficial. Optionally, it is a network node which performs the handover evaluation process 70 and/or a decision to perform the handover.

Figure 3A:
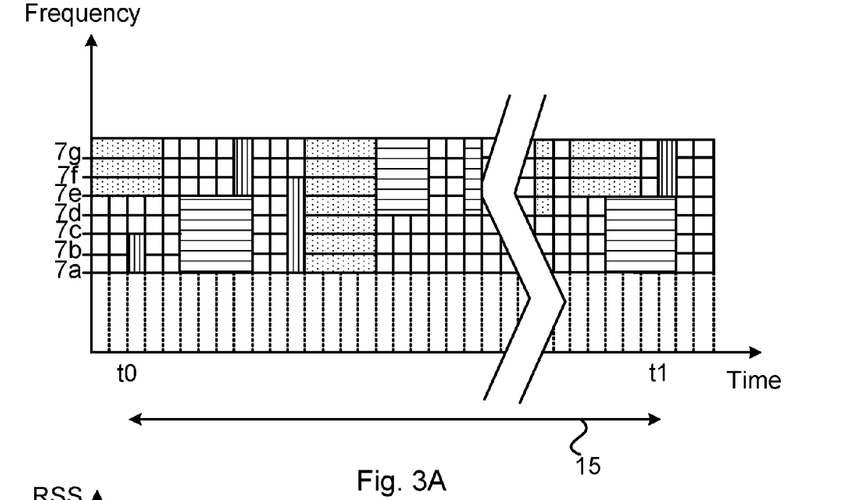
FIG. 3A is a schematic diagram illustrating a history of radio traffic, comprising transmissions of mobile devices over time.
Figure 3B:
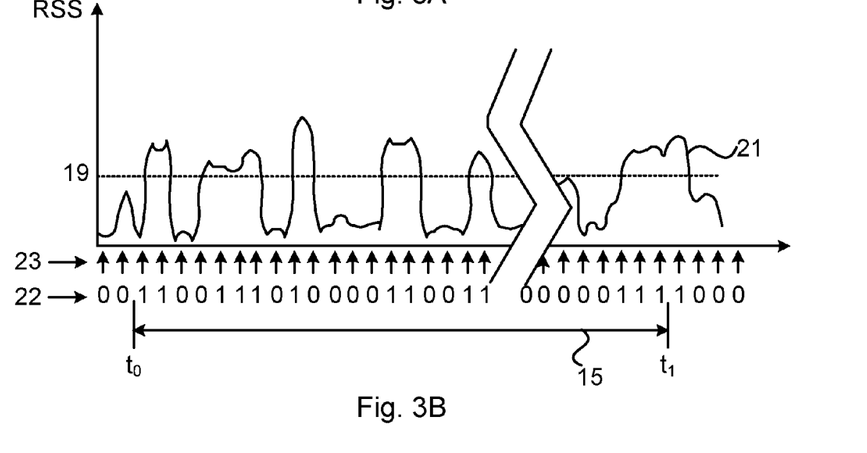
FIG. 3B is a schematic diagram illustrating the received signal strength over time in a radio traffic detector.
Figure 3C:
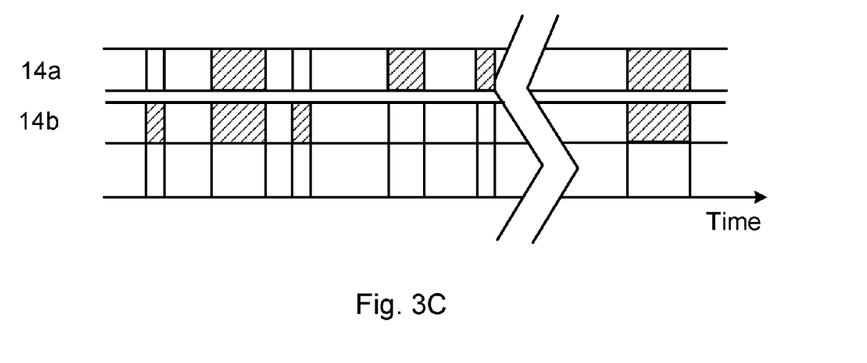
FIG. 3C is a schematic diagram illustrating identification of mobile devices using the combination of the received signal strength of FIG. 3B and history of radio traffic of FIG. 3A.

FIGS. 3A-C will now be referred to for explaining how mobile devices being active in the uplink are detected using the radio traffic detector of FIG. 1.

FIG. 3A is a schematic diagram illustrating a history of radio traffic 27 comprising transmissions of mobile devices over time. It is here shown an example of an uplink transmission schedule from the four mobile devices 2a-d shown in FIG. 1. The horizontal axis represents time and the vertical frequency represents frequency, defining a time—frequency coordinate system. This defines a number of tiles, where the tiles in the frequency—time coordinate system represent spectrum resource that can be allocated to a mobile device. It is to be noted though it is not excluded, e.g. in case of WCDMA, that several mobile devices share the same spectral resource at any one time. In such a situation, the tiles extend vertically and can e.g. span the whole frequency band in question.

In the example illustrated here, however, the tiles can differ in frequency usage. As illustrated in FIG. 1, the radio traffic detector 10 listening in the cell 3 of the access point 10 can detect only the transmissions from the first mobile device 2a and the second mobile device 2b, independently of what mobile network cell they are connected to.

The tiles which are filled with dots indicate resources used by mobile devices which are scheduled for uplink transmission but are outside the detector range of the radio traffic detector. The tiles which are filled with horizontal lines indicate resources which are used by mobile devices which are scheduled for uplink transmission in the first mobile network cell 4a and the tiles which are filled with vertical lines indicate resources which are used by mobile devices which are scheduled for uplink transmissions in the second mobile network cell 4b. The diagram of FIG. 3A thus illustrates the scheduling of uplink resources in the mobile network cells of FIG. 1. We are here concerned with a time period 15 from a start time to to an end time ti.

FIG. 3B is a schematic diagram illustrating the received signal strength 21 over time in the radio traffic detector 10 in the example of FIG. 3A and FIG. 1. If the coverage of the radio traffic detector is adjusted to correspond to the coverage area of the connected access point 11 of FIG. 1, only transmission signals from the first mobile device 2a and the second mobile device 2b appear as peaks in the received signal strength 21 (since only these are within the coverage area of the access point 11). The two terminals may use different parts of the bandwidth and may transmit at different power levels, yet the primary factor in their detection is the path loss, i.e. their proximity to the radio traffic detector which determines if the radio traffic detector 10 will be able to detect their uplink signals. As is discussed in more detail below, false and missed detections can nevertheless be tolerated to a large extend in this process.

In the bottom of FIG. 3B, sampling instants 23 are depicted as small arrows. The time period 15 is the same as the time period 15 of FIG. 3A and is used for evaluation of measurements. The time period 15 is selected such that a sufficient number of samples of the received signal strength 21 are able to catch relevant uplink transmissions from mobile devices.

Optionally, the radio traffic detector evaluates each sample to form logical values 22. Each logical value is set to be positive when the received signal strength value of the associated sample (of the same time) is above a threshold value 19. The positive value then indicates a significant received signal strength. The threshold value 19 can be preconfigured or dynamically evaluated. Ideally, the threshold value is set such that uplink traffic from mobile devices within, and only within, the coverage of the access point results in a positive logical value.

The time period 15 is defined such that it is likely that a sufficient amount of uplink traffic is able to be detected. Nevertheless, the time period 15 only needs to be a fraction of all time and repeated at intervals. In this way, the radio traffic detector and/or the access point can be in a power saving mode between measurements.

The logical values 22, along with a timestamp of the time period 15 (e.g. the start time to) is then sent in a message to the network manager node 5 and/or the network node. The history of radio traffic is known at the network nodes, so they can be the ultimate recipients of the message coming from the radio traffic detector. Also, the network nodes are the nodes which match the history of radio traffic to received signal strength patterns. There may be more than one network nodes (corresponding to radio base stations 12a-b of FIG. 1), needing to perform the pattern matching, whereby there could be an association between access point and network node (and thus radio base station), pointing out the target network node (or radio base station) for each access point. That association can be held in the network manager node, in one or all of the network nodes or in another node in the network. If there is no direct connection between the network nodes and the access node, e.g. they belong to different RATs, messages in either direction between the access node and network nodes can be relayed through the network manager node.

Alternatively, the entire digitized received signal strength 12 can be sent in the message. The information rate required to transmit the received signal strength 12 is still negligible compared to typical cell throughput, so if the access point has a wideband backhaul connection, then the backhaul can be used only intermittently. This allows the access point to utilize periodic power saving mode for energy efficiency.

FIG. 3C is a schematic diagram illustrating identification of mobile devices using the combination of the received signal strength of FIG. 3B and history of radio traffic of FIG. 3A. The result shown in FIG. 3C is achieved by matching the history of radio traffic shown in FIG. 3A with the received signal strength shown in FIG. 3B. This matching is described in more detail below. In this example, the upper shaded areas 14a represent identification of the first mobile device 2a in the first mobile network cell 4a and the lower shaded areas 14b represent identification of the second mobile device 2b in the second mobile network cell 4b.

Figures 4A, 4B:
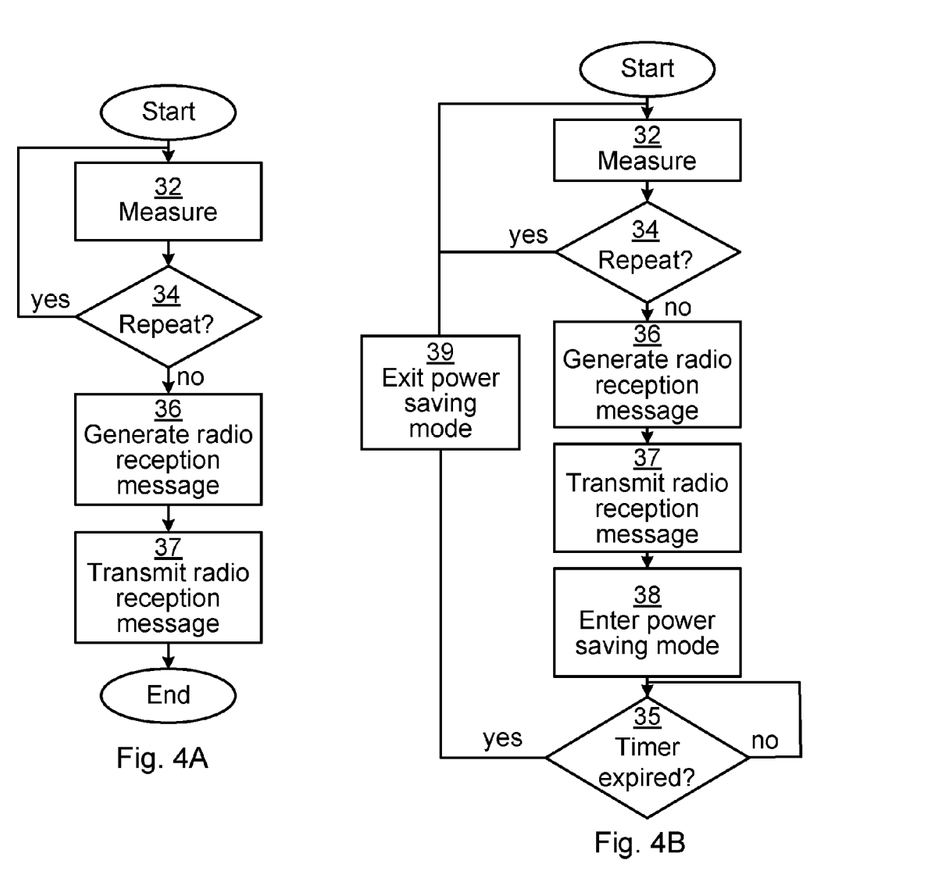
FIGS. 4A-B are flow charts illustrating embodiments of methods for assisting a determination of a mobile device being a candidate for handover, performed in a radio traffic detector.

FIGS. 4A-B are flow charts illustrating embodiments of methods for assisting a determination of a mobile device being a candidate for handover performed in a radio traffic detector. The method illustrated by the flow chart of FIG. 4A will be described first.

In an initial measure step 32, a received signal strength value on a predetermined frequency band is measured. Optionally, a plurality of contiguous or non-contiguous frequency bands are used for the measuring. One example of such a measurement is seen as a section in time of the received signal strength value 21 of FIG. 3B. This measure step 32 corresponds to the measure step 32 of FIG. 2.

In a repeat step 34, it is determined whether the measurements are to be repeated. This is determined e.g. by evaluating whether a measurement time period (15 of FIGS. 3A-B) has passed since the first measurement. If the measurement is to be repeated, the method returns to the measure step 32. Otherwise, the method continues to a generate message step 36.

In the generate message step 36, a message is generated. The message comprises a timestamp associated with the time period (15 of FIGS. 3A-B), and a plurality of message elements. Each message element is based on a respective received signal strength value for respectively different time instances within the time period. This step corresponds to the generate message step 36 of FIG. 2.

Optionally, each message element comprises a logical value (22 of FIG. 3B). This step then comprises determining each logical value to be positive when an associated received signal strength value is above a threshold value (19 of FIG. 3B). In this way, the positive value of the message element indicates a significant received signal strength.

Alternatively, each message element comprises the respective signal strength value (21 of FIG. 3B) in digitised form.

In a transmit message step 37, the message is transmitted to a network node to assist the determination of mobile devices being candidates for handover.

Now the method illustrated by the flow chart of FIG. 4B will be described. This method is similar to the method of FIG. 4A, and only new or modified steps, compared to the method of FIG. 4A will be described here.

After the transmit message 37, there is here a enter power saving mode step 38. In the enter power saving mode 38, the radio traffic detector 10 enters a power saving mode. This can e.g. be a sleep mode, dormant mode, idle mode, etc. In the power saving mode, certain hardware and/or software components are switched off to save power.

In a conditional timer expired step 35, it is determined whether a timer has expired. The timer is a power saving mode timer and controls for how long the radio traffic detector is to be in a power saving mode after each transmittal of message.

If the timer has expired, the method continues to an exit power saving mode 39. Otherwise, the method returns to the timer expired step 35 again.

Alternatively, there is a time based wakeup signal which is provided instead of having to check against a timer.

In the exit power saving mode 39, the radio traffic detector 10 exits the power saving mode and returns to the measure step 32. For measurements in a new time period (15 of FIGS. 3A-B).

Figure 5A:
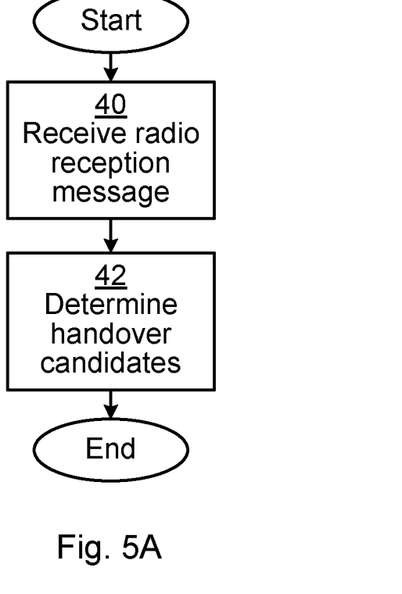
FIGS. 5A-B are flow charts illustrating embodiments of methods for determining a mobile device being a candidate for handover performed in a network node of FIG. 1.
Figure 5B:
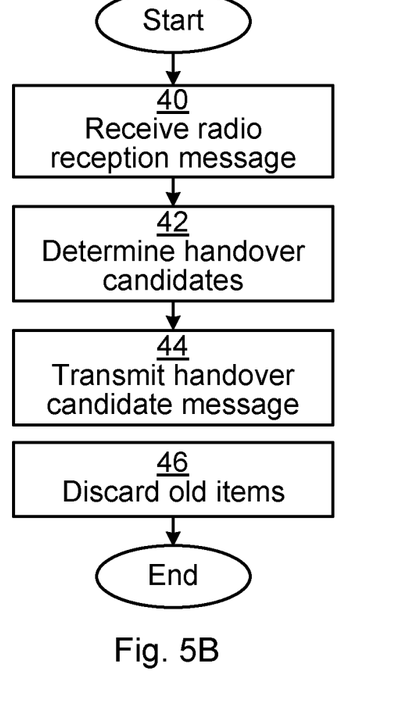

FIGS. 5A-B are flow charts illustrating embodiments of methods for determining a mobile device being a candidate for handover performed in a network node of FIG. 1.

In a receive message step 40, the message is received from the radio traffic detector, as sent in the transmit message step 37 of FIGS. 4A-B.

In a determine handover candidates step 42, zero of more mobile devices are determined to be candidates for handover by comparing the message with a history of radio traffic (27 of FIG. 3A). The history of radio traffic comprises data about what mobile devices were active at what times. It is to be noted that in the situation that frequency is not a distinguishing parameter between mobile devices (such as in W-CDMA), only time can is used to distinguish between mobile devices. It may thus be necessary to use a longer time period to reduce the risk of coincidental false positives.

Optionally, this step comprises determining a mobile device to be a candidate for handover when, for at least a threshold number of instances, there is an indication of activity of the mobile device in the history of radio traffic and, for a corresponding time, a message element indicating a significant received signal strength, wherein the history of radio traffic corresponds to the time period. The threshold number of instances can e.g. be the number of message elements having an indication of activity of the mobile device at a corresponding time in the history of radio traffic.

Optionally, upon receiving the radio reception message, the network node activates any connected access points that are in power saving mode, i.e. makes the access points exit power saving mode.

One embodiment of the determination candidates will now be described in some detail.

The network node takes the message elements and searches for the first peak in time (either a positive logical value or a peak in a digitized received signal strength value). The timeframe of the peak is identified and the mobile device or mobile devices are looked up in the history of radio traffic, to find from whom the transmission was originated in the given timeframe. Optionally, it can be assumed that whenever a mobile device transmits within range of the radio traffic detector during the time period (15 of FIGS. 3A-B), the mobile device would be detected by the radio traffic detector. So if this mobile device or these mobile devices remain close to the access point and, in particular, the radio traffic detector, then there are corresponding peaks in the received signal strength measurement for all their transmissions. If that condition is satisfied, then the mobile device is placed on the list of handover candidates. So the network node first goes through all mobile devices that can be associated with the first peak, then over the mobile devices that can be associated with the second peak and so on. After a while, mostly mobile devices already being included on the candidate list are found. Potentially, several mobile devices from the scheduling history have to be checked, whom the condition does not apply for, since they are not close to the hot spot (see e.g. the fourth mobile terminal 2*d* of FIG. 1, being out of range for the radio traffic detector 10). They might have just coinciding transmissions with hotspot mobile devices.

Since the mobile device identification process is a pattern matching mechanism for random sample sequences of limited length, false positive and negative matches might occur. But decision mistakes have minor impact on performance, meanwhile any successful mobile device identification brings benefit, it eases the operation of mobile devices in general, and it limits signalling and thus saves processing time and energy for the mobile devices.

Looking first to false positive hits, inclusion of a mobile device outside the coverage area of the access point on the list of handover candidates may occur in special situations. For example, when several mobile devices simultaneously and very actively transmit towards mobile network cells from within the coverage of the access point. If a mobile device outside the coverage of the access point releases only a few transmit bursts in such a situation, then there is a certain chance that its transmissions coincide with transmissions by mobile devices within the coverage of the access point. The probability of this happening can be decreased by extending the time period (15 of FIGS. 3A-B), since the chance of repeated coincidence is smaller. The chance for false inclusion becomes also smaller if the mobile devices within the coverage of the access point transmitting towards mobile network cells eventually make the handover to the access point.

Practical scheduling implementations in e.g. LTE also lower the chance of identifying and including mobile devices outside the coverage of the access point on the list of handover candidates. Although theoretically more than one mobile device can be scheduled in uplink at a time, schedulers typically grant the entire uplink band to a single mobile device if that mobile device can fully fill the timeslot with data. The other mobile devices get their chances in other scheduling cycles.

Yet if false mobile device identification occurs, the regular preparation for handover follows (70 of FIG. 2). The network requests the mobile device to start measuring the access points and to report the results back to the serving mobile network cell. But eventually it becomes obvious that the mobile device does not see the broadcast of the access point strongly enough, so the handover preparation process is abandoned. Overall, we can still conclude that the network side activity was not entirely wasted even in such cases. Although the network side carries more tasks than it carries in the regular IRAT handover process, it is compensated by the elimination of handover related tasks on a mass population of mobile devices.

Looking now to missed identification, this type of error in the identification process occurs if a mobile device is within the coverage of the access point and it transmits towards one of mobile network cells, yet the mobile device is not included among the handover candidates. For that to happen, it may be sufficient if one of the transmissions of the mobile device is missed by the radio traffic detector, e.g. due to the signal strength remains below the threshold. According to one embodiment, the mobile device is then not included in the list of handover candidates. But in practice, this is not a problem, since mostly fast-moving or sparsely active mobile devices are missed this way. From the viewpoint of efficient system operation, the goal is to primarily hand over those mobile devices which are active and remain within the coverage of the access point. Sooner or later such mobile devices are correctly detected in one of the consecutive scans.

Another situation that might cause issues and should be prevented is where the antenna of the radio traffic detector does not match the coverage of the access point. To avoid such a situation, the coverage of network traffic detector should be set to be smaller than that of the access point. Proper adjustment of the antenna and threshold can assure that only the mobile devices which are very likely to be served by the access point are considered to be candidates for handover.

FIG. 5B is similar to FIG. 5A and only additional or different aspects, compared to the method illustrated FIG. 5A, will now be described with reference to FIG. 5B. After the determine handover candidates step 42, there is here a transmit handover candidate message step 44.

In the transmit handover candidate message step 44, a handover candidate message is transmitted to a network manager node (5 of FIG. 1). The handover candidate message comprises identities of one or more mobile devices having been determined to be candidates for handover.

In a discard old items step 46, items in the history of radio traffic being older than a threshold age are discarded. This prevents the history of radio traffic to grow excessively in size over time.

Figure 6:
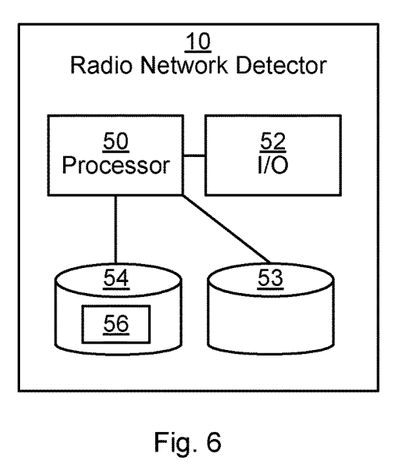
FIG. 6 is a schematic diagram illustrating some components of a radio traffic detector.

FIG. 6 is a schematic diagram illustrating some components of a radio traffic detector 10. A processor 50 is provided using any combination of one or more of a suitable central processing unit (CPU), multiprocessor, microcontroller, digital signal processor (DSP), application specific integrated circuit etc., capable of executing software instructions 56 stored in a computer program product 54, e.g. in the form of a memory. The processor 50 may be configured to execute the method described with reference to FIGS. 5A-B above.

The computer program product 54 may be a memory comprising any combination of read and write memory (RAM) and/or read only memory (ROM). The memory also comprises persistent storage, which, for example, may be any single one or combination of magnetic memory, optical memory, solid state memory or even remotely mounted memory.

Figure 10:
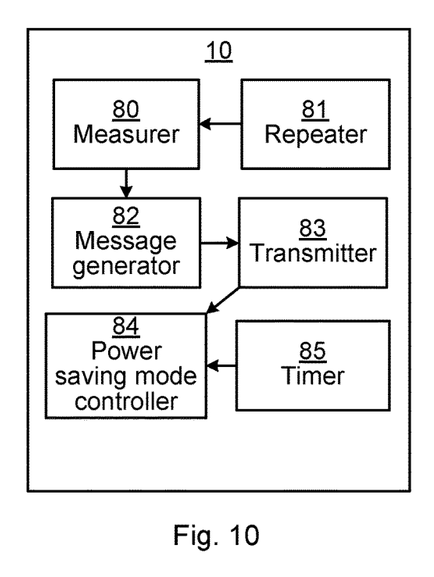
FIG. 10 is a schematic diagram illustrating functional modules of a radio traffic detector of FIGS. 1, 6 and 8A-B.

In one embodiment, the computer program product 54 is a means for performing the steps of the methods of FIGS. 4A-B, illustrated as functional modules in FIG. 10.

The radio traffic detector 10 also comprises a data memory 53, being a persistent or volatile digital memory. The data memory 53 may be any single one or combination of magnetic memory, optical memory, solid state memory or even remotely mounted memory. Optionally, the data memory 53 is combined with the computer program product 54.

The radio traffic detector 10 further comprises an I/O interface 52 for communicating with the network node, access point and/or other nodes.

The radio traffic detector 10 also comprises one or more antennas 55 and a receiver 51 for detecting radio signals. The receiver 51 can be configured to measure received signal strength at one or more frequency bands to detect uplink traffic from mobile devices as described above. The processor 50 controls the general operation of the network node 1, e.g. by sending control signals to the receiver 51 and receiving reports from the transceiver 51.

When integrated with an access point, any one or more of the components of the radio traffic detector 10 can be shared with the housing access point.

Figure 7:
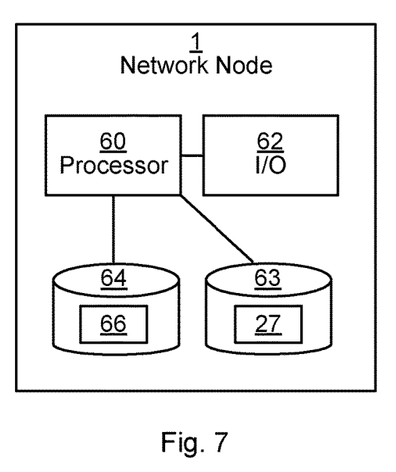
FIG. 7 is a schematic diagram illustrating some components of the network node of FIG. 1.

FIG. 7 is a schematic diagram illustrating some components of the network node 1 of FIG. 2.

A processor 60 is provided using any combination of one or more of a suitable central processing unit (CPU), multiprocessor, microcontroller, digital signal processor (DSP), application specific integrated circuit etc., capable of executing software instructions 66 stored in a computer program product 64, e.g. in the form of a memory. The processor 60 may be configured to execute the method described with reference to FIGS. 6A-B above.

The computer program product 64 may be a memory comprising any combination of read and write memory (RAM) and/or read only memory (ROM). The memory also comprises persistent storage, which, for example, may be any single one or combination of magnetic memory, optical memory, solid state memory or even remotely mounted memory.

Figure 11:
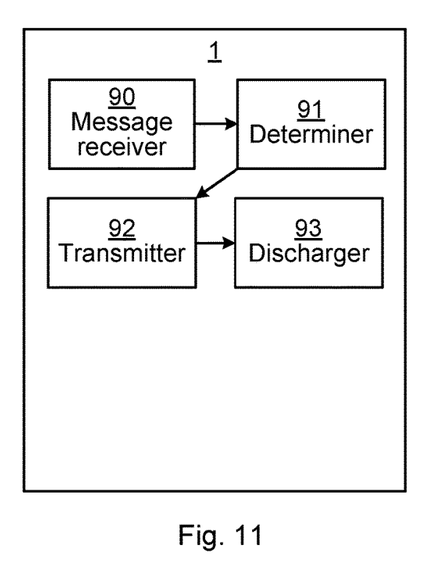
FIG. 11 is a schematic diagram illustrating functional modules of a network node of FIGS. 1, 7 and 9A-B.

In one embodiment, the computer program product 64 is a means for performing the steps of the methods of FIGS. 5A-B, illustrated as functional modules in FIG. 11.

The network node 1 also comprises a data memory 63, being a persistent or volatile digital memory. The data memory 63 may be any single one or combination of magnetic memory, optical memory, solid state memory or even remotely mounted memory. Optionally, the data memory 63 is combined with the computer program product 64. The data memory 63 can e.g. store the history of radio traffic 27.

The network node 1 further comprises an I/O interface 62 for communicating with the radio base station, core network and/or network manager node.

When integrated with a radio base station 12, any one or more of the components of the network node 1 can be shared with the housing radio base station 12.

Figure 8A:
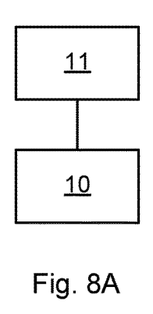
FIGS. 8A-B are schematic diagrams illustrating embodiments of where the radio traffic detector is implemented.
Figure 8B:
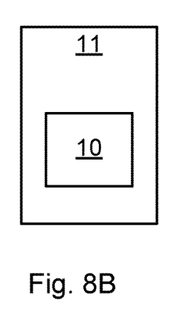

FIGS. 8A-B are schematic diagrams illustrating embodiments of where the radio traffic detector 10 is implemented. In FIG. 8A, an embodiment is shown where the radio traffic detector 10 is implemented as a device separate from, but connected to, an access point 11. In FIG. 8B, an embodiment is shown where the radio traffic detector 10 is implemented as a device integrated with the access point 11.

Figure 9A:
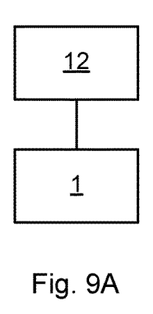
FIGS. 9A-B are schematic diagrams illustrating embodiments of where the network node is implemented.
Figure 9B:
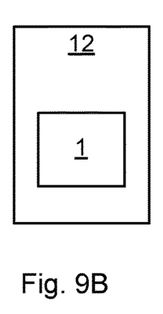

FIGS. 9A-B are schematic diagrams illustrating embodiments of where the network node 1 is implemented. In FIG. 9A, an embodiment is shown where the network node 1 is implemented as a device separate from, but connected to, a radio base station 12. In FIG. 9B, an embodiment is shown where the network node 1 is implemented as a device integrated with the radio base station 12.

Using the embodiments presented herein, mobile devices can be detected in a more robust and less resource requiring way. This has a number of effects.

Interworking of different RATs is improved. in case these RATs have a common network manager node. This is especially beneficial if there is a large variety of RATs and frequencies used in an area, since the mobile devices are relieved from the duty of scanning or searching for these separately. Instead, the network side takes care of the selection of optimal RAT, frequency and cell.

Since the radio traffic detector does not need to know of any protocols of the other RAT for the mobile devices, these can be kept simple, resource efficient and robust. This allows IRAT handover process to be effected even to access point being in power saving mode; only the detector functionality is turned on during the identification period.

FIG. 10 is a schematic diagram illustrating functional modules of a radio traffic detector 10 of FIGS. 1, 6 and 8A-B. The modules can be implemented using hardware and/or software such as a computer program executing in the radio traffic detector. When implemented in software, the modules may depend on an execution environment which utilises the controller 50, computer program product 54 and an I/O interface 52 of FIG. 6. The modules correspond to steps of the methods shown in FIGS. 4A-B.

In a measurer 80, a received signal strength value is measured on a predetermined frequency band. The measurer 80 can perform the measure step 32 illustrated in FIGS. 4A-B.

A repeater 81 controls the measurer 80 to repeat the measuring during a time period 15. The repeater 81 can perform the repeat step illustrated in FIGS. 4A-B.

A message generator 82 generates a message comprising a timestamp associated with the time period (15), and a plurality of message elements. Each message element is based on a respective received signal strength value for respectively different time instances within the time period. The message generator can perform the generate radio reception message step 36 illustrated in FIGS. 4A-B.

A transmitter 82 transmits the message to the network node to assist the determination of mobile devices being candidates for handover. The transmitter 82 can perform the transmit radio reception message step 37 illustrated in FIGS. 4A-B.

A power saving mode controller 84 controls the entering into and exiting from a power saving mode. The power saving mode controller 84 can perform the enter power saving mode step 38 and exit power saving mode illustrated in FIG. 4B.

A timer 85 controls the power saving mode controller as to when to enter and/or exit the power saving mode. The timer 85 can perform the timer expired step 35 illustrated in FIG. 4B.

FIG. 11 is a schematic diagram illustrating functional modules of a network node 1 of FIGS. 1, 7 and 9A-B. The modules can be implemented using hardware and/or software such as a computer program executing in the network node 1. When implemented in software, the modules may depend on an execution environment which utilises the controller 60, computer program product 64 and an I/O interface 62 of FIG. 6. The modules correspond to steps of the methods shown in FIGS. 5A-B.

A message receiver 90 receives a message from the radio traffic detector. The message comprises a timestamp associated with a time period and a plurality of message elements. Each message element is based on a respective received signal strength value for respectively different time instances within the time period. The message receiver 90 can perform the receive radio reception message step 40 illustrated in FIGS. 5A-B.

A determiner 91 determines a mobile device to be a candidate for handover by comparing the message from the message receiver 90 with a history of radio traffic, wherein the history of radio traffic comprises data about what mobile devices were active at what times. The determiner 91 can perform the determine handover candidates step 42 illustrated in FIGS. 5A-B.

A transmitter 92 transmits a handover candidate message to the network manager node. The handover candidate message comprises identities of one or more mobile devices having been determined to be candidates for handover. The transmitter 92 can perform the transmit handover candidate message step 44 illustrated in FIG. 5B.

A discarder 93 discards items in the history of radio traffic which are older than a threshold age. The discarder 93 can perform the discard old items step 46 illustrated in FIG. 5B.

The invention has mainly been described above with reference to a few embodiments. However, as is readily appreciated by a person skilled in the art, other embodiments than the ones disclosed above are equally possible within the scope of the invention.

The invention claimed is:

1. A method arranged to assist a determination of mobile devices being candidates for handover, the method being performed in a radio traffic detector and comprising:
measuring a received signal strength value on a predetermined frequency band;
repeating the measuring during a time period;
generating a message comprising a timestamp associated with the time period, and a plurality of message elements, wherein each message element is based on a respective received signal strength value for respectively different time instances within the time period and comprises a logical value, wherein generating the message comprises determining each logical value to be positive when an associated received signal strength value is above a threshold value, the positive value of the message element indicating a significant received signal strength; and
transmitting the message to a network node to assist the determination of mobile devices being candidates for handover.

2. The method of claim 1, further comprising:
entering a power saving mode; and
exiting the power saving mode and returning to the measuring when a timer expires.

3. A radio traffic detector arranged to assist a determination of mobile devices being candidates for handover, the radio traffic detector comprising:
a processor; and
a non-transitory computer-readable medium storing instructions that, when executed by the processor, cause the radio traffic detector to:
measure a received signal strength value on a predetermined frequency band;
repeat the measuring during a time period;
generate a message comprising a timestamp associated with the time period, and a plurality of message elements, wherein each message element is based on a respective received signal strength value for respectively different time instances within the time period and comprises a logical value, wherein the message is generated by determining each logical value to be positive when an associated received signal strength value is above a threshold value, the positive value of the message element indicating a significant received signal strength; and
transmit the message to a network node to assist the determination of mobile devices being candidates for handover.

4. The radio traffic detector of claim 3, wherein the stored instructions further comprise instructions to: enter a power saving mode; and exit the power saving mode and return to the measuring when a timer expires.

5. A method arranged to determine a mobile device being a candidate for handover, the method being performed in a network node and comprising:
receiving a message from a radio traffic detector, the message comprising a timestamp associated with a time period and comprising a plurality of message elements, wherein each message element is based on a respective received signal strength value for respectively different time instances within the time period; and
determining a mobile device to be a candidate for handover by comparing the message with a history of radio traffic, wherein the history of radio traffic comprises data about what mobile devices were active at what times.

6. The method of claim 5, wherein the determining comprises determining a mobile device to be a candidate for handover when, for at least a threshold number of instances, there is an indication of activity of the mobile device in the history of radio traffic and, for a corresponding time, a message element indicating a significant received signal strength, wherein the history of radio traffic corresponds to the time period.

7. The method of claim 6, wherein in the determining a mobile device to be a candidate for handover, the threshold number of instances is the number of message elements which have an indication of activity of the mobile device at a corresponding time in the history of radio traffic.

8. The method of claim 6, further comprising:
transmitting a handover candidate message to a network manager node, the handover candidate message comprising identities of one or more mobile devices having been determined to be candidates for handover.

9. The method of claim 6, further comprising:
discarding items in the history of radio traffic being older than a threshold age.

10. A network node arranged to determine a mobile device being a candidate for handover, the network node comprising:
   a processor; and
   a non-transitory computer-readable medium storing instructions that, when executed by the processor, cause the network node to:
      receive a message from a radio traffic detector, the message comprising a timestamp associated with a time period and comprising a plurality of message elements, wherein each message element is based on a respective received signal strength value for respectively different time instances within the time period; and
      determine a mobile device to be a candidate for handover by comparing the message with a history of radio traffic, wherein the history of radio traffic comprises data about what mobile devices were active at what times.

11. The network node of claim 10, wherein the instructions to determine comprise instructions to determine a mobile device to be a candidate for handover when, for at least a threshold number of instances, there is an indication of activity of the mobile device in the history of radio traffic and, for a corresponding time, a message element indicating a significant received signal strength, wherein the history of radio traffic corresponds to the time period.

12. The network node of claim 11, wherein the instructions to determine a mobile device to be a candidate for handover, comprises instructions for the threshold number of instances being the number of message elements which have an indication of activity of the mobile device at a corresponding time in the history of radio traffic.

13. The network node of claim 10, wherein the stored instructions further comprise instructions to: transmit a handover candidate message to a network manager node, the handover candidate message comprising identities of the mobile devices having been determined to be candidates for handover.

14. The network node of claim 10, wherein the stored instructions further comprise instructions to: discard items in the history of radio traffic being older than a threshold age.

* * * * *